US006208133B1

(12) United States Patent
Ehling et al.

(10) Patent No.: US 6,208,133 B1
(45) Date of Patent: Mar. 27, 2001

(54) METHOD AND APPARATUS FOR CALIBRATING THE OUTPUT SIGNAL OF A LINEAR POSITION DETECTOR

(75) Inventors: Ernst Ehling, Neuhausen; Ernst Gass; Andreas Ullrich, both of Stuttgart; Martin Kurz, Kreis Esslinger, all of (DE)

(73) Assignee: Balluff, Inc., Florence, KY (US)

( * ) Notice: Subject to any disclaimer, the term of this patent is extended or adjusted under 35 U.S.C. 154(b) by 0 days.

(21) Appl. No.: 09/164,896

(22) Filed: Oct. 1, 1998

(51) Int. Cl.$^7$ .................................................. G01R 35/00

(52) U.S. Cl. ................ 324/202; 324/207.13; 324/207.24

(58) Field of Search .............................. 324/202, 207.12, 324/207.13, 207.24, 207.2, 207.21; 338/32 R, 32 H (56) References Cited

U.S. PATENT DOCUMENTS

| | | | |
|---|---|---|---|
| 3,898,555 | * 8/1975 | Tellerman | 324/207.13 |
| 5,311,124 | 5/1994 | Hubbard et al. | 324/207.13 |
| 5,406,200 | * 4/1995 | Begin et al. | 324/207.13 |

OTHER PUBLICATIONS

Balluff, Inc., *BTL Linear Displacement Transducer Analog Serices A. B. C. E. Digital and Series P*, Catalog Number 507E, Edition 9001, pgs. 1–23, Jan. 1990.

* cited by examiner

Primary Examiner—Jay Patidar
(74) Attorney, Agent, or Firm—Dinsmore & Shohl LLP (57) ABSTRACT

A method and apparatus for calibrating the output signal of a linear position detector without accessing the interior of the detector housing is provided. According to one exemplary embodiment, a magnet is selectively movable toward and away from the exterior of the electronics housing, and a sensor is provided within the housing for sensing the presence of the magnet. According to this embodiment, the linear position detector is calibrated by setting a movable marker at the desired position and pushing the magnet toward the housing. The sensor then detects the presence of the magnet, and a processor saves the position of the marker as a reference point. All future positions of the marker can then be scaled based upon the reference point. Thus, the linear position detector can be calibrated without the need for opening the electronics housing and potentially exposing the electronics components to moisture, contaminants, and/or static electricity. Preferably, the magnet is connected to a push button on a base, and the base includes an attachment mechanism, such as a clip for example, to attach the base to the position detector.

23 Claims, 5 Drawing Sheets

METHOD AND APPARATUS FOR CALIBRATING THE OUTPUT SIGNAL OF A LINEAR POSITION DETECTOR

TECHNICAL FIELD

The present invention relates to methods and apparatus for calibrating the output signal of linear position detectors, and, in one preferred embodiment, to a calibration system for defining reference points in a linear position detector in which energy, such as magnetic energy, is provided on the exterior of the detector housing and received by a sensor within the housing, so that the housing need not be opened during calibration, thereby preserving the moisture resistant housing seal.

BACKGROUND OF THE INVENTION

A magnetostrictive linear position detector typically includes a magnetostrictive waveguide wire which is housed in a protective waveguide housing about which a magnet is slidingly engaged. A current pulse is sent through a wire near the waveguide (or through the waveguide itself), and this pulse interacts with the magnetic energy of the magnet to induce a torsional strain wave in the magnetostrictive waveguide at the location of the magnet. The strain wave travels along the length of the waveguide and passes through a mode convertor, such as a pickup coil, which converts the mechanical wave into an electrical signal. To obtain the location of the magnet, the time between the transmission of the current pulse and the reception of the signal from the coil can be measured and converted to a distance, because the speed that the torsional wave will travel along the waveguide is known. Accordingly, when the magnet is connected to a movable mass, such as a liquid level quantity in a storage tank, or a movable element in a machine tool for example, the exact position of the mass can be measured and monitored.

In more advanced magnetostrictive linear position detectors, the ability to set reference points along the measurement stroke is provided. For example, in some such sensors, the magnet can be positioned at any location along the waveguide housing, and a button or buttons can be pressed to save the current position of the magnet in memory so that this position can be used as a reference point. In some systems, the output signal to be provided at this reference point car be assigned, such as by manipulating the programming buttons. Additional reference points can also be assigned and utilized in a similar manner.

Such calibration systems allow the output of the transducer to be changed from the original setup provided by the manufacturer. For example, while the manufacturer might configure the transducer to provide a 0 volt output when the magnet is at one end of the waveguide housing and a 10 volt output when at the opposite end, the ultimate user of the transducer may desire different settings. With such a calibration system, the user could assign any possible voltage output to any of the possible magnet positions. For example, the user may wish that a position 2 inches (50.8 mm) from the first end provides a 0 volt output, and that a position 3 inches (76.2 mm) from the opposite end provides a 10 volt output. By using such a calibration system, these reference points can be assigned the desired outputs. Once the reference points are assigned, the system can then be set up to scale all subsequent magnet positions based upon the reference points.

Accordingly, the programmability or adjustability of reference points allow the user to customize the sensor to provide the desired output range over the desired measurement stroke. Thus, a reference point can be, for example, an endpoint of the stroke.

However, such calibration systems are not without disadvantages. For example, such systems can expose the electronics to potential damage. More specifically, to access the programming buttons, screws or other covers on the electronics housing must be removed, and the buttons can then be depressed by extending a pin or screw driver through the resulting access openings. However, providing such access openings, even when sealed off by screws and the like, can compromise the ability of the housing to seal off moisture and other contaminates which can damage the delicate electronic components inside. In many applications, an excellent watertight seal is required, such an IP67 rated seal, and access openings generally diminish the ability of the housing to achieve and maintain such a seal.

Moreover, if the screw or cover is lost or is not properly replaced over the access opening after the desired programming has been conducted, the seal is again compromised or lost. In addition, the device used to depress the programming buttons, such as a screwdriver, pin, or finger, can carry electrostatic charge which can itself damage electronic components within the housing.

Accordingly, it is desirable to provide a system and method for calibrating a linear position detector which does not affect the ability of the transducer's electronics housing to protect against undesirable ambient and external moisture, contaminates, and electrostatic discharge, and which does not require opening and closing or other physical access through the housing for programming the detector.

SUMMARY OF THE INVENTION

Accordingly, it is an object of the present invention to obviate the above-described problems.

It is another object of the present invention to provide a linear position detector having adjustable output capability while also providing good protection from moisture and contaminants.

Another object of the present invention is to provide a system and method for calibrating the output signal of a linear position detector which eliminates the need to provide access openings to the interior of the transducer housing.

Yet another object of the present invention is to provide a system and method for calibrating the output signal of a linear position detector which minimizes the risk of damaging electronic components.

It is another object of the invention to provide a linear position detector with adjustable output capability that includes a simpler electronics housing design.

Yet another object of the present invention is to provide a linear position detector which can be calibrated in a simpler and more efficient manner.

To achieve the foregoing and other objects, and in accordance with the purposes of the present invention as described above, a calibration system for a linear position detector having a movable marker is provided. According to the present invention, the system comprises a housing having a wall and an energy source located exterior to the housing. An energy sensor is located within the housing and arranged for selective communication with the energy source through the housing wall. A processor is also located within the housing and arranged in communication with the sensor. The processor is adapted to define a reference point based upon the current position of the marker when the energy sensor receives a predetermined energy signal from the energy source. Preferably, the energy source is a magnet and the energy sensor is a Hall effect sensor, although other sources of energy could be utilized, such as sources of electromagnetic or electrical energy.

The energy source could be coupled to a base having an attachment mechanism adapted to attach the base adjacent the exterior of a housing of a linear position detector. In addition, the energy source could be selectively movable from a home position to a selection position.

According to the present invention, a method for calibrating the output signal of a linear position detector having a housing and movable marker is provided. The method comprises selectively providing energy from a location exterior of the housing, sensing the presence of the energy, and, upon sensing the energy, defining a reference point based upon the current position of the movable marker.

A calibration system for a linear displacement detector having a movable marker is provided according to the principles of the present invention. The system comprises a housing, an activator located exterior to the housing, and a processor located within the housing. The activator is adapted to selectively apply an energy signal from an energy source through the housing. The processor is adapted to define a reference point based upon the current position of the marker when the energy signal is received within the housing. The activator can comprise a button or switch, for example, and the energy source can comprise a source of magnetic or electrical energy, for example.

Still other aspects of the present invention will become apparent to those skilled in this art from the following description wherein there is shown and described preferred embodiments of this invention, simply by way of illustration, as well as a best mode contemplated for carrying out the invention. As will be realized, the invention is capable of other different aspects and embodiments without departing from the scope of the invention. Accordingly, the drawings and descriptions should be regarded as illustrative in nature and not as restrictive in nature.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION OF THE PREFERRED EMBODIMENTS

Referring now to the drawings in detail, wherein like numerals indicate similar elements throughout the views, FIGS. 1–6 illustrate a preferred embodiment of an external calibration device 10 for use with a linear position detector, according to the principles of the present invention. The calibration device 10 includes a base 12 having a back side 14, a front side 16 located generally opposite the back side, a top 18, and a bottom 20 generally oppositely disposed from the top. Preferably, the base 12 is made of a rigid material such as plastic, although a number of materials could be utilized, such as aluminum, fiberglass, carbon fiber, or steel for example.

Figure 1:
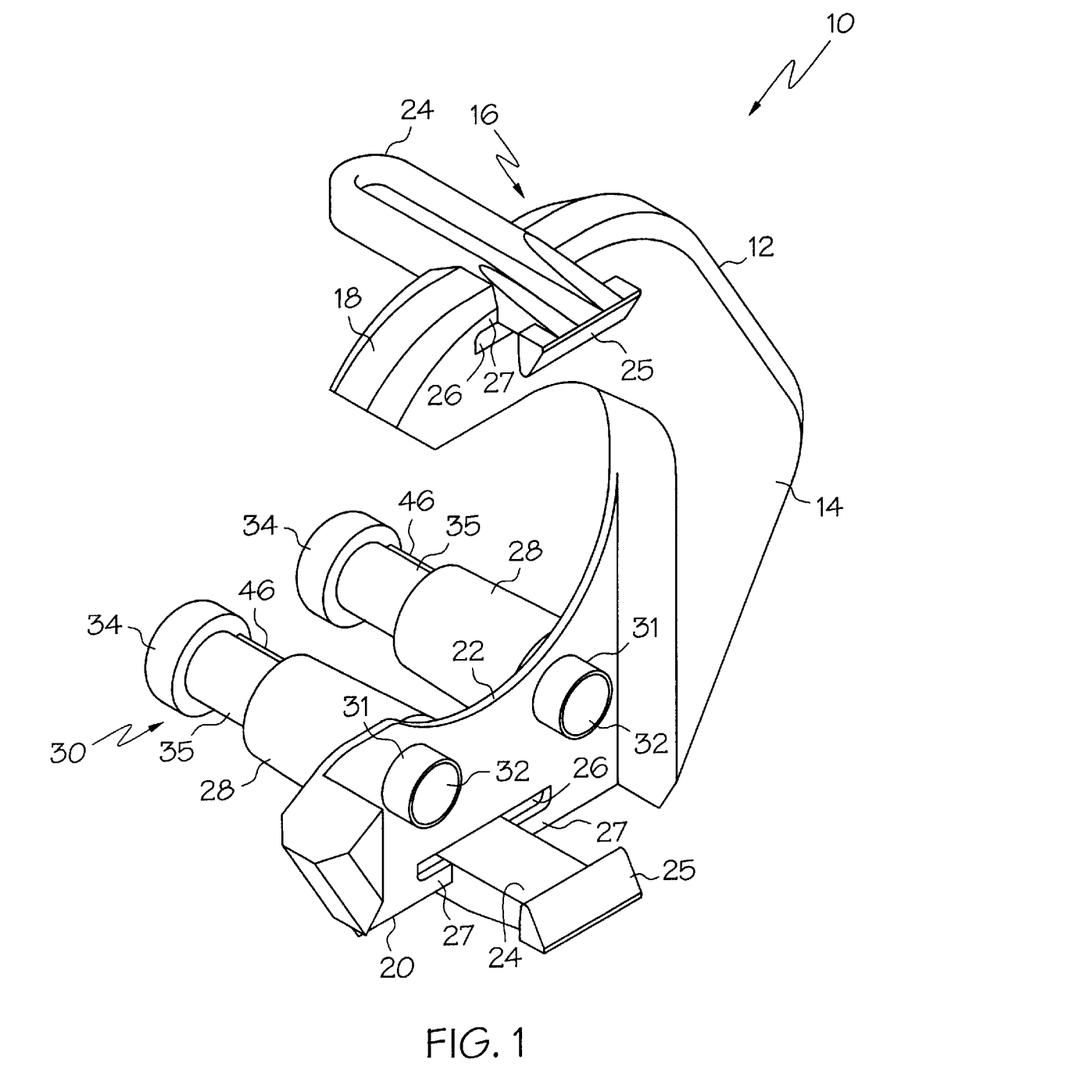
FIG. 1 is a perspective view of a calibration apparatus adapted for selective clipping adjacent the housing of a linear position detector, according to one exemplary embodiment of the present invention.
Figure 3:
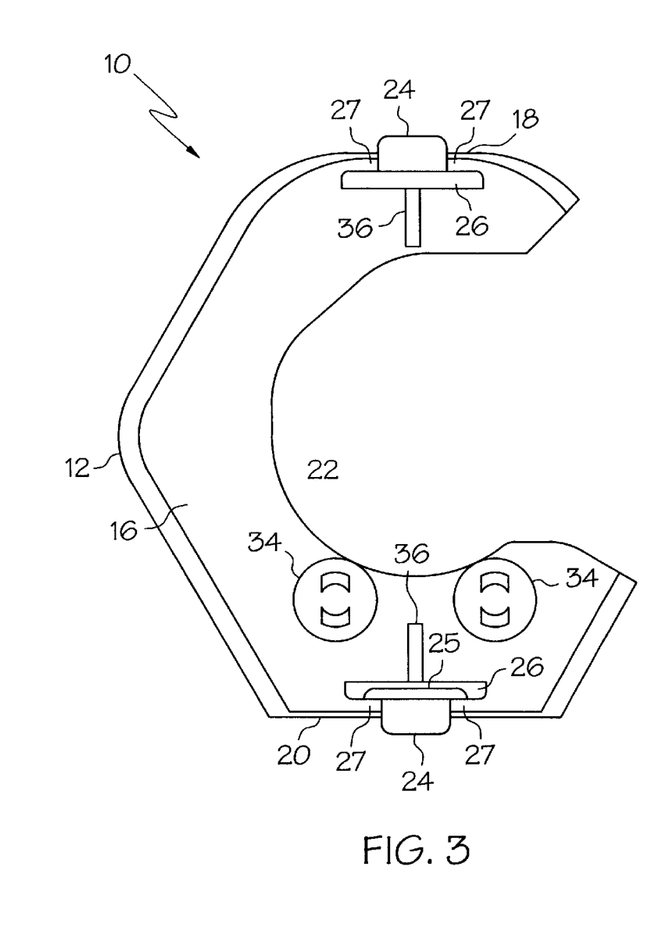
FIG. 3 is a front view of the apparatus of FIG. 1.

Preferably and as best shown in FIGS. 1 and 3, an inner surface 22 of the base 12 defines an opening, such that the base is generally hook, loop, or "C" shaped. Accordingly, any connectors or protrusions on the linear position sensor about which the device 10 is attached may conveniently extend through the opening in the base 12 unencumbered, as described further below.

For attachment of the device 10 to or adjacent to a linear position sensor, it is preferred that base 12 include a pair of clips 24 near its top 18 and bottom 20. These exemplary attachment mechanisms 24 can be connected to the base in a number of manners, although it is preferred that they be integrally connected with the base. More specifically, as best shown in FIGS. 1 and 3, the base 12 preferably includes a pair of gaps 26 formed near the top 18 and bottom 20 of the base 12, the gaps being bridged by a pair of spans 27. Accordingly, the spans 27 can integrally connect with the clips 24. Such an arrangement provides the clips 24 with a desirable amount of flexibility and/or rotatability, so that they may accommodate slight misalignments and the like and can be more easily attached and removed from the position sensor as desired.

Figure 2:
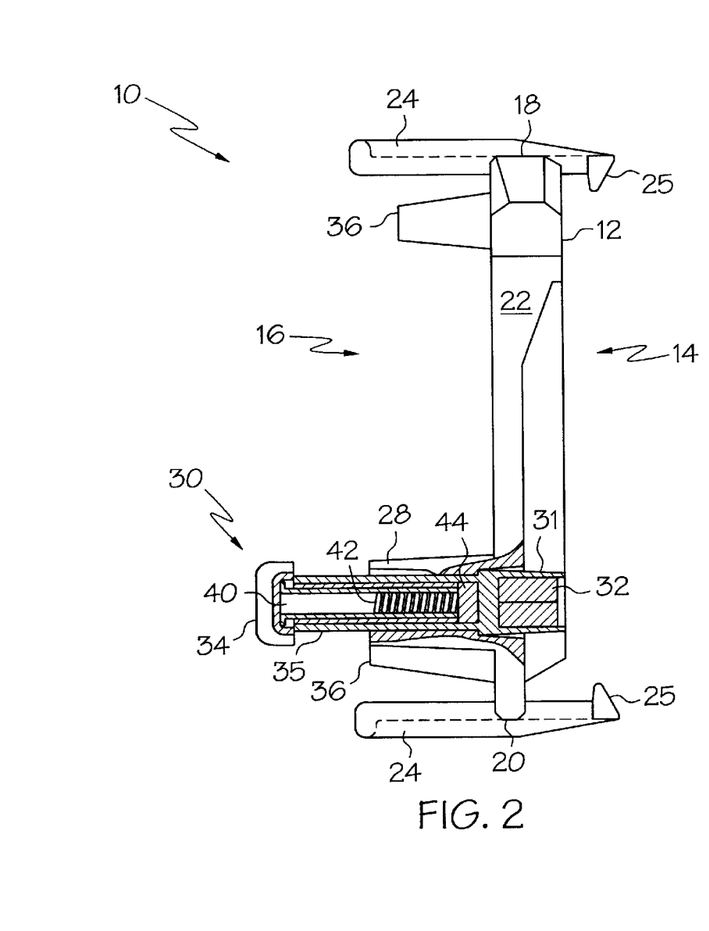
FIG. 2 is a side view of the apparatus of FIG. 1, with the button and magnet of the apparatus shown in cross section.

As shown best in FIG. 1 and FIG. 2, each clip 24 preferably includes a tooth or extension 25 formed at one end of the clip. Preferably, each tooth 25 extends generally inwardly, toward the center of the device 10. Such extension or tooth 25 is provided to engage a corresponding slot formed in the housing of the sensor, as will be described in more detail below with respect to FIG. 6.

Figure 4:
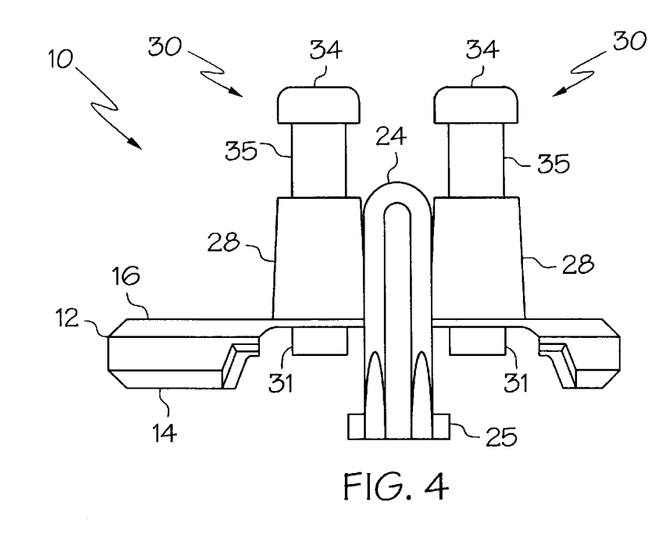
FIG. 4 is a bottom view of the apparatus of FIG. 1.

The base 12 also includes a pair of generally hollow tubes or channels 28 which extend from the lower section of the base, as shown in FIG. 1, FIG. 2, and FIG. 4. Preferably, these tubes 28 are integrally formed with the base 12, although other connections or attachments could equally be utilized. While tubes 28 are shown as generally tubular structures, it is contemplated that other structures, such as open channels, cages or guide rings could similarly be utilized.

In addition to the base 12, the calibration device 10 also preferably includes a pair of push buttons 30 which are each slidingly mounted at least partially within a respective hollow tube 28 of the base 12. Each push button 30 preferably includes a head 34 and a tip 31, with the head and tip being connected by a middle portion 35, as is best seen in FIG. 2. Each of these parts of the button 30 can be made from a rigid material such as plastic or nylon, similar to that of base 12, although it should be understood that any of a variety of materials could be utilized without departing from the scope of the invention.

The tip 31 of each button 30 is preferably hollow, so as to allow for the mounting of a magnet 32 therewithin. A variety of mechanisms can be used to secure each magnet 32 adjacent each tip 31. For example, each magnet 32 can be adhesively mounted at least partially within the tip 31, sealed within the tip 31, or otherwise placed snugly adjacent the end of the tip, such as through an interference fit, adhesive, etc. Each magnet 32 provides magnetic energy and thereby acts as a source of energy which can be sensed by an energy sensor, such as a Hall effect sensor, within the housing of the linear position transducer. When the magnet 32 is placed in sufficient proximity of the energy sensor, such as by pushing the button toward the housing of the transducer, sufficient magnetic flux can be provided to the sensor to trip the sensor such that it provides a reception signal. The operation of this exemplary embodiment is described in further detail below with respect to FIGS. 6–8.

Figure 5A:
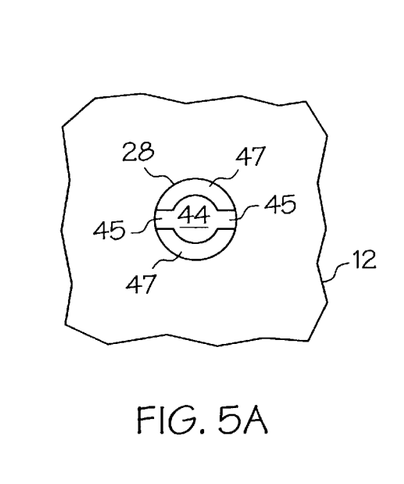
FIG. 5a is a partial, enlarged front view of the tube of the apparatus of FIG. 1, with the button removed from the tube for clarity.

FIG. 2 includes a cross-sectional view of the button 30. As shown in this figure, a rod 40 is mounted in the hollow head 34 of the button 30 and extends into the hollow middle section 35 of the button. Coiled about the rod 40 is a spring 42 for biasing the button to a predetermined non-extension or home position. When the button 30 is mounted in the tube 28, the spring 42 extends between the head 34 of the button and a retainer or plug 44 which extends into the middle of the hollow interior of the tube 28. As shown in FIG. 5a, each hollow tube 28 preferably includes a plug 44 which includes a pair of cross-spans 45 for integral connection of the plug 44 with the interior wall of the tube 28. The plug 44 provides a surface upon which the spring 42 can be compressed and also helps to retain button 30 in assembled condition with device 10. In this regard, as also shown in FIG. 5a, the plug 44 does not completely close off the tube 28. Rather, a pair of passages 47 are defined by the plug 44, and these passages 47 allow the button to be captively retained within tube 28 and selectively reciprocated in an axial direction along tube 28. For example, as button 30 is pushed inwardly through the tube 28, the head 34 of the button approaches the tube, while the spring compresses between the head and the plug 44.

Figure 5B:
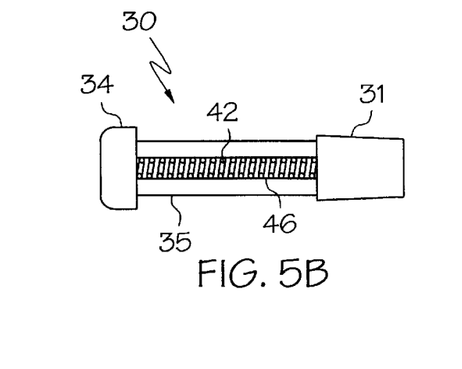
FIG. 5b is a side view of one of the two buttons included in the apparatus of FIG. 1.

More specifically, the middle portion 35 of each button 30 is provided with a slot 46 on each side, as best shown in FIG. 1 and FIG. 5b. In a preferred embodiment, middle portion 35 can be provided as an integral, skeletal or cage-like structure which can receive and retain rod 40 and the spring 42 telescoped thereover, while accommodating portions of plug 44 (e.g. its cross spans 45) to allow captive reciprocation. Each slot 46 is of a sufficient width such that each cross span 45 can extend outwardly through the slot, when the button 30 is mounted in the tube 28. Accordingly, each slot 46 slidingly engages a cross span 45 as the button 30 is pushed inwardly, as well as when the button springs back to its home position when the button is released. Likewise, the upper and lower portions of the middle section 35, which define the slot 46, slidingly engage the passages 47. Plug 44 simultaneously provides a "stop" at the inner end of spring 42.

Preferably, the middle section 35 of the button 30 is integrally connected with the tip 31, but is detachably connected to the head 34. With this configuration, the button can be assembled by sliding the upper and lower portions of the middle section 35 through the passages 47 in the tube 28. Then, the spring 42 can be placed about the rod 40, and the rod connected to the head 34. Finally, the head 34 can be connected to the middle section 35, such as by providing threads or notches in the head with which the portions of the middle section can frictionally engage, so as to establish a "snap" in fit. Accordingly, as best shown with respect to FIG. 2, the button 30 can slide within the tube 28 while the spring 42 is compressed between the head 34 and the plug 44. When the button is pushed inwardly, it is prevented from being pushed out of the tube because the outer diameter of the head 34 is larger than the inner diameter of the tube 28. When the button 30 is released and the spring 42 biases it back to the home position, the button is prevented from being forced all the way out of the tube 28 because the inner face of the tip 31 contacts the plug 44. While this particular captive and reciprocating arrangement is preferred, it should be understood that reciprocable association of the button and its magnetic flux source with device 10 can be accomplished by any of a variety of other arrangements. For example, other spring loaded bayonet-type assemblies might be substituted.

Figure 6:
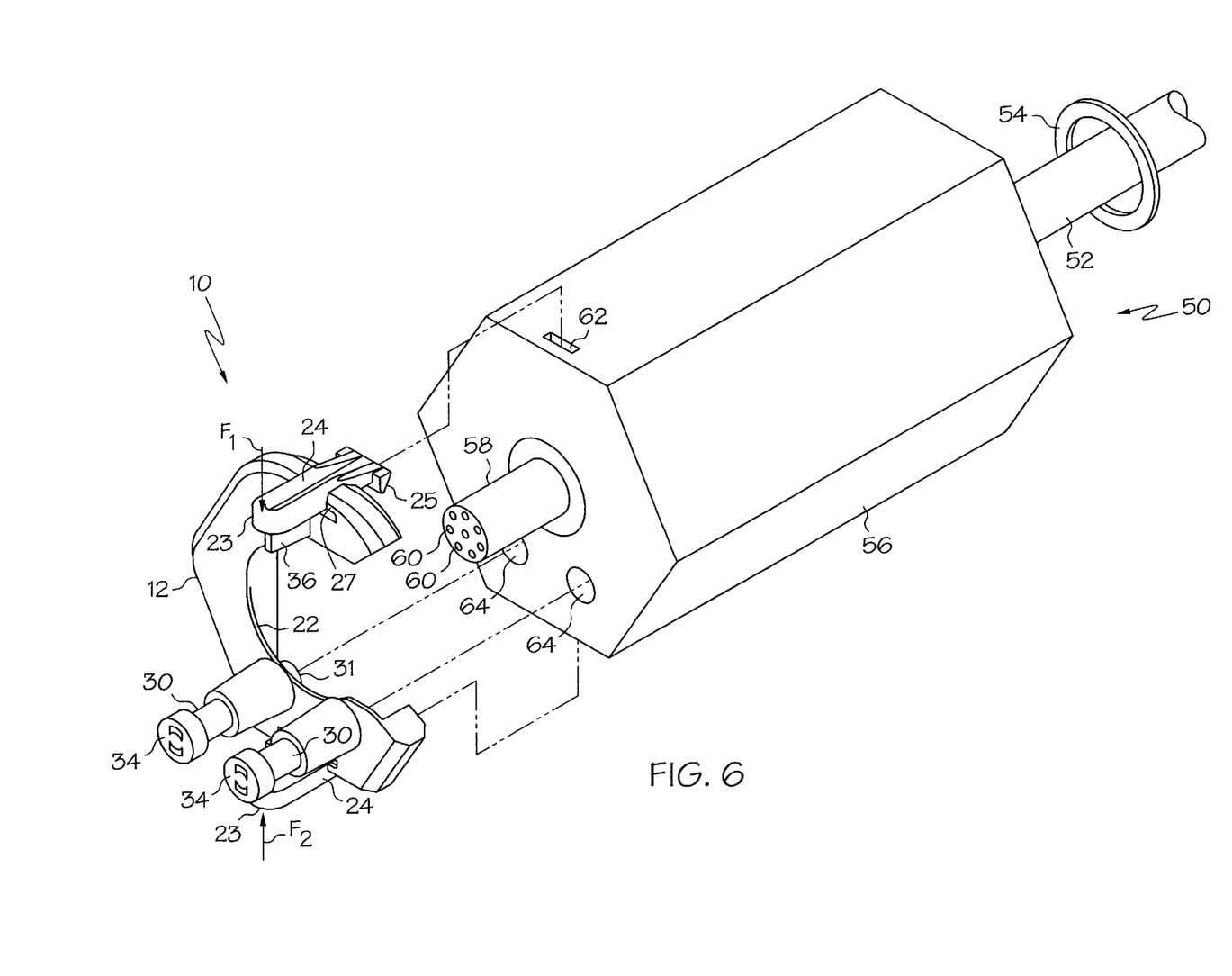
FIG. 6 is a partial perspective view of the calibration apparatus of FIG. 1 and a linear position detector having an exemplary electronics housing for receiving the calibration apparatus, according to the principles of the present invention.

FIG. 6 illustrates a preferred manner in which the exemplary calibration device of FIGS. 1–5 could engage a linear position detector. More specifically, a linear position detector 50 can be provided having a waveguide housing 52, a magnetic marker 54 which slidingly moves along the housing 52, and an electronics housing 56 which is connected to the waveguide housing. In this example, the magnetostrictive waveguide wire as well as the support and damping members for the wire are housed within the waveguide housing 52, while the pulse generator, position measurement circuits, and other electronic components for determining the position of the marker 54 are preferably housed within the electronics housing 56, as is known in the art. A flange connector 58 is preferably provided adjacent to the housing 56 for connecting the electronics with the various input and output devices with which the detector will be used. Pins 60 are provided on the connector 58 for connecting to the various inputs, such as the voltage source and ground inputs, as well as to provide the output which is relative to position, such as a 0–10 volt analog output, or a 0–20 mA current output for example. Details of one possible configuration for a linear position detector are described in U.S. Pat. No. 3,898,555, the entire disclosure of which is hereby incorporated herein by reference.

According to one aspect of the present invention, the electronics housing 56 is provided with a groove or other locking device 62 on its top surface. A similar groove or locking device (not shown) is preferably also provided on the bottom surface of the housing 56. As can be understood, the grooves 62 allow the calibration device 10 to be detachably mounted adjacent to the detector 50 in a uniform and reliable manner. More specifically, as the calibration device 10 is brought near the housing 56, inward forces $F_1$ and $F_2$ can be directed near the outer ends 23 of the clips 24 and toward the center of the device 10, such that the clips are adjusted (e.g. rotated or flexed) slightly about the cross-spans 27. These forces cause the tooth 25 of the top clip 24 to move upwardly slightly and the tooth of the bottom clip 24 to move downwardly slightly, as the outer ends 23 of the clips are forced inwardly and closer to the center of the device 10. This bending or flexing of the clips provides sufficient clearance so that the clips 24 can fit over the top and bottom outer surfaces of the electronics housing 56. Appropriate forces can be provided to the clips 24, for example, by squeezing the clips 24 between the thumb and forefinger. Stops 36 can be provided to prevent the clips 24 from being flexed too far and from breaking off.

As the clips slide over the housing 56 and toward the grooves 62, the tips 31 of the buttons 30 should be aligned with inlets 64 provided in the housing. Once the tooth 25 reaches the groove 62 and the force on the clip 24 is released, the tooth will engage the groove, providing a "snap" in fit or temporary positioning arrangement between calibration device 10 and the linear position detector. Accordingly, the calibration device 10 is securely held adjacent to the electronics housing 56. At this point, the tips 31 of the buttons 30 are preferably situated at least adjacent or partially within the recesses or inlets 64. In addition, the flange connector 58 preferably extends through the middle opening 22 of device 10.

While the clips 24 are an example of a particular attachment mechanism for attaching the calibration device 10 to the housing 56, it should be understood that any number of other mechanisms for situating or attaching the device adjacent to the housing and linear position sensor could be provided without departing from the invention. For example, screws, pins, hooks, snaps, corresponding engageable parts, or other mechanisms could be utilized.

The electronics housing 56 can be formed of a hard aluminum alloy or steel material. The grooves 62 and inlets 64 are preferably formed within the material and do not provide a passageway into the housing interior. Accordingly, an excellent seal from moisture and contaminants can be maintained at all times. To help maintain this seal, it is preferred that the flange connector 58 and the waveguide housing 52 tightly connect with the electronics housing 56, such as by using appropriate screw-type fittings as well as sealing material and devices.

Because the tips 31 of the buttons 30 do not completely fill the recesses 64, they can be pushed further into the inlets by pressing the button heads 34. As best shown in the close-up view of FIG. 7 wherein the electronics housing wall is shown in cross-section, because the inlets 64 are sealed from the interior of the housing, the tips 31 remain exterior to the housing, although they may make contact with or otherwise approach the housing wall 70 inside of the inlet by pressing the button heads 34.

Figure 7:
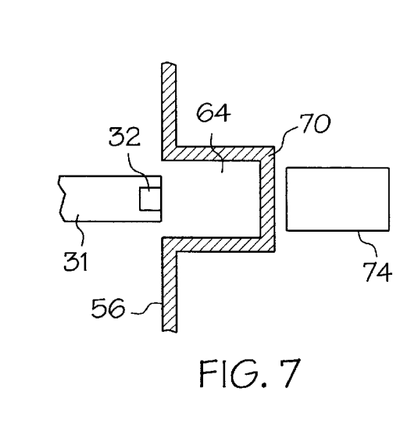
FIG. 7 is a diagram illustrating an exemplary interface between the linear position detector and the calibration apparatus of FIG. 6, and showing the electronics housing in cross-section.

On the opposite side of wall 70, magnetic field sensors 74 are provided within the housing interior near each inlet 64, such as on a circuit board. Such a sensor 74 can detect the presence of a magnetic field. For example, a Hall effect sensor could be utilized wherein a voltage is produced which is proportional to the strength of the field. In a typical Hall effect sensor, if the voltage exceeds an adjustable threshold voltage level, a switch will be thrown and an output signal provided indicating that the magnetic energy has been sensed. An exemplary Hall effect sensor is the HAL 115 manufactured by ITT Semiconductor. Other magnetic field sensors which provide an output signal and/or which switch a switching device in the presence of a magnetic field (and/or which otherwise indicate the presence of a magnetic field) could be used as well. For example, the KMZ10A magnetic field sensor, manufactured by Philips Semiconductors, could be utilized.

Accordingly, when it is desired to define a reference point, such as an end point of the measurement stroke, the button head 34 can be pressed forcing the button tip 31 closer to the housing wall 70. This movement causes the flux producer or magnet 32 which is arranged adjacent the tip 31 to also move closer to the housing wall 70, and, accordingly, closer to the sensor 74. Because the magnet 32 is closer to the sensor 74, the magnetic field received by the sensor is stronger, causing the sensor 74 to provide the output signal and/or to trip a switch.

As is known in the art, the sensitivity of the sensor 74 can be adjusted such that the magnet 32 does not trip the sensor 74 when it is in the home position at some initial distance away from the sensor 74, and also such that the magnet 32 does trip the sensor when it is in a "selection" position, some distance closer to the sensor. If a Hall effect sensor is utilized, this tuning of the sensitivity of the sensor can be achieved by adjusting the threshold voltage. An alternative way to assure that the magnet trips the sensor at the appropriate position of the button 30 would be to experiment with different energy sources or, for example, magnets having stronger or weaker magnetic properties until the appropriate switching is obtained. Preferably, the magnet comprises a ferrox material. Other magnetic materials might be used as well.

An additional way to adjust the sensitivity would be to change the distance that a sensor 74 is positioned with respect to the electronic housing wall 70 and/or to adjust the depth of the inlet 64. In one preferred embodiment, the magnet 32 has a diameter of approximately 0.17 inches (4.4 mm) and a depth of approximately 0.21 inches (5.3 mm). In this embodiment, the buttons 34 are configured such that the button tips 31 protrude about 0.10 inches (2.5 mm) into the inlets 64 when in the home position and protrude approximately 0.35 inches (9.0 mm) into the inlets 64 when in the fully extended (select) position. Each inlet 64 of this exemplary embodiment is about 0.40 inches (10.2 mm) deep, and has a diameter of about 0.26 inches (6.6 mm), and each Hall effect sensor 74 is placed adjacent to the housing wall 70. The housing wall 70 is preferably about 0.059 inches (1.5 mm) thick at the end of the inlet 64, such that a relatively thin layer is provided between each magnet 32 and each Hall effect sensor 74. Other configurations, arrangements, and dimensions are also possible and may be dependent upon the type and size of magnet and type and sensitivity of sensor utilized.

Once the button 30 is released, the tip 31 moves away from the housing wall 70 and returns to the home position due to the bias of the spring 42. The sensor 74 then ceases providing the output and/or switches to the non-detection state because the tip 31 has moved away from the sensor 74, thereby reducing or eliminating the magnetic energy which permeates the sensitive component or components in the sensor. Other alternative configurations and/or movements of the buttons 30 could be used as well. For example, rather than using a linear movement, the button could be configured as a swing arm to arc toward and away from the sensor housing.

Figure 8:
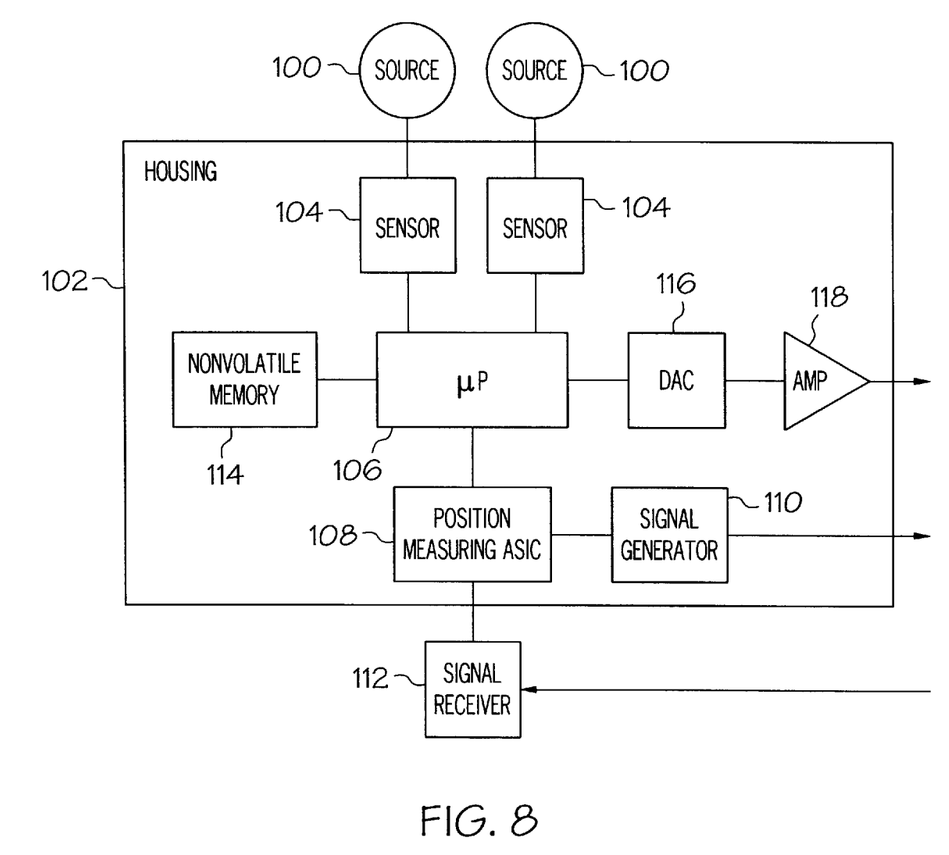
FIG. 8 is a block diagram illustrating an exemplary calibration system for adjusting the output of a linear position detector, according to the principles of the present invention.

FIG. 8 is a block diagram illustrating an exemplary calibration system according to the principles of the present invention. As shown, two or more energy sources 100 are preferably positioned exterior to the housing 102. Within the housing 102 are also positioned two corresponding sensors 104, each sensor being appropriately adapted and/or positioned for receiving energy, such as magnetic energy for example, from one of the sources 100 at selected times. Accordingly, each sensor 104 is in communication with a source 100. (When a first device is described herein as being "in communication with" a second device, it is meant that the first device is adapted to transmit energy to the second device and/or receive energy from the second device. That communication can be accomplished by any of a variety of structures, such as hard wiring, wireless transmission or the like.)

For example, each source 100 could provide a magnetic field, such as described with respect to the exemplary embodiment of FIGS. 1–7. Alternatively, each source 100 could comprise a radio frequency transmitter for transmitting electromagnetic waves. The sensor 104 would then comprise a device capable of detecting the presence of the signal transmitted. For example, an audible tone generator and receiver could be used, as could transmitters and receivers used in radio communication and the telecommunications industries. Another alternative might be to provide a light emitting device, such as a light emitting diode, as the source 100. Then, provided that the housing 102 includes transparent portions to allow in the emitted light, the sensors 104 could comprise photosensitive devices such as phototransistors, for example. Another alternative would be to place a switch on the exterior of the housing and to connect the switch to a source, such as a voltage source, which can be located either on the exterior or interior of the housing 102. The switch could then be selectively activated to apply the energy signal from the source through the housing and to a sensor or processor within the housing, such as through a wired conductive connection, to indicate that a reference point is to be defined. Accordingly, it is contemplated that a variety of devices could be provided to serve as the source 100 and the sensor 104, without departing from the scope of the invention.

When a sensor 104 detects energy from its corresponding source 100, the sensor can provide an output signal to a microprocessor 106 indicating the reception of the energy. In one embodiment, such a microprocessor then receives the position of the magnetic marker from the position measuring circuit 108. As is known in the art, this circuit controls a signal generator 110 for providing an interrogation signal through the conductor near the waveguide. The resulting torsional strain wave in the waveguide is detected by a signal receiver 112, which can comprise a pickup coil, transducer, mode convertor, or the like. The time between the transmission of the interrogation signal by the pulse generator 110 and the reception of the resulting signal at the signal receiver 112 is measured and converted to a position by the circuit 108, as is known in the art. The microprocessor 106 can then save this position in a memory location, such as the non-volatile memory 114. A similar process could be used with the other of the two sources 100 to define a second reference point, such as a second endpoint of the measurement stroke.

In addition to saving the current position, the microprocessor 106 could also assign predetermined voltages to the two saved reference points when defining these points. For example, the microprocessor 106 could be programmed such that the position saved when the first sensor 104 is tripped could be assigned a value of 0 volts and the position saved when the second sensor 104 is tripped could be assigned a value of 10 volts. Then, the microprocessor 106 could scale all future measurements based upon these reference points, such as by using a linear interpolation equation. Then, when circuit 108 measures a point between the two reference points, the microprocessor 106 would adjust the output that could otherwise be provided based upon the saved reference points. For example, for a point that is measured as being halfway between the two reference points, an output of 5 volts could be provided by the microprocessor 106. This output could then be converted from the digital format to an analog format by the digital-to-analog converter 116 and then amplified by the amplifier circuit 118 to be output to the user. Alternatively, the user could be provided with the digital output directly from the microprocessor 106.

In addition, instead of programming predetermined voltage values (e.g., 0 and 10 volts) for the positions that are measured when the sensors 104 are tripped, the output voltage could be user-definable during the defining of the reference points. For example, after the first sensor 104 receives the signal from the source 100, the microprocessor 106 could save the position measured by the circuit 108 and then allow the user to select a voltage to be assigned to this position. The two sources 100 could be utilized to move a displayed number up or down until the desired value is reached. Then both sources 100 could be activated simultaneously to indicate that the value should be saved, and used as the output for the saved position.

An alternative method of defining the reference points would be to utilize the saved positions to define a scaling equation based upon the positions that are detected by the position measuring circuit 108 when the sensors 104 are tripped.

The following is an exemplary scaling equation that could be used:

$$output = (position - low\ ref) * (volt\ range / (high\ ref - low\ ref))$$

wherein
low ref is the smaller value of the two positions saved during calibration;
high ref is the larger value of the two positions saved during calibration;
volt range is the range of voltages that is to be output between the two reference points (e.g. 0–10 volts); and
position is the position measured by the position measuring circuit.

For example, consider the situation where the microprocessor 106 is initially configured to provide 0 volts at a detected position of 0 inches along the waveguide housing and 10 volts at a detected position of 10 inches (254 mm). If the circuit 108 indicates a position of 2 inches (the low ref) when the first sensor 104 is tripped, and a position of 8 inches (the high ref) when the second sensor 104 is tripped, the resolution would become 10 volts per 6 inches, rather than 10 volts per 10 inches. Then, for all positions detected between 2 and 8 inches, 2 inches could be subtracted, and the result multiplied by 10/6. For example, a detected position of 6 inches would result in: (6−2)*10/6=6.67 volts. This value of 6.67 volts would then be output from the processor 106 and converted to an analog signal by the digital to analog converter (DAC) 116. Positions detected outside of the 2 to 8 inch range could produce a predetermined error signal or alarm. Other methods for defining reference points are possible as well.

It is also contemplated that a timing requirement could be utilized with the system to prevent unintentional tripping of the sensors. For example, it could be required that the sensor 104 receive the signal from the source 100 for a certain amount of time before the microprocessor 106 will define the reference point. For example, in the example of FIG. 6, the microprocessor 106 could be programmed such that the button 30 must be pressed for two seconds before the microprocessor will take action. This can be achieved by programming the microprocessor 106 with a counter or clock routine to determine the length of time that a signal is received from the sensor 104.

In addition, other lockout or security mechanisms could be utilized. For example, the microprocessor 106 could be programmed such that a particular sequence and/or repetition of button presses must take place before allowing programming. For example, it could be required that the following code be received before programming is allowed: 1-2-1-1-2-2, where 1 represents pushing button 1, and 2 represents pushing button 2.

As described above, it is preferred that two energy sources are provided for defining two separate reference points. However, it should be understood that fewer or more sources could be utilized for defining additional reference points and/or to accomplish other functions. For example, a single magnet could be mounted on a single button, and the first press of the button could cause the first reference point to be defined, the second press of the button could cause the second reference point to be defined, and so on. Also, if the processor within the housing is already equipped to detect the energy from the source, then a separate sensor would not be necessary.

The foregoing description of the preferred embodiments of the invention has been presented for purposes of illustration and description. It is not intended to be exhaustive or to limit the invention to the precise form disclosed, and modifications and variations are possible in light of the above teachings.

Thus, it should be understood that the embodiments were chosen and described in order to best illustrate the principals of the invention and its practical application to thereby enable one of ordinary skill in the art to best utilize the invention in various embodiments and with various modifications as are suited for the particular use contemplated. Accordingly, it is intended that the scope of the invention be defined by the claims appended hereto.

What is claimed is:

1. A calibration system for a linear position detector having a movable marker, the system comprising:
   a housing having a wall;
   an energy source located exterior to the housing;
   an energy sensor located within the housing and arranged for selective communication with the energy source through the housing wall; and
   a processor located within the housing and arranged in communication with the sensor, wherein the processor is adapted to define a reference point based upon the current position of the marker when the energy sensor receives a predetermined energy signal from the energy source.

2. The calibration system as recited in claim 1, wherein the energy source comprises a magnet, the energy signal comprises magnetic energy of a predetermined strength, and the energy sensor comprises a magnetic field sensor.

3. The calibration system as recited in claim 2, wherein the magnet is movable toward and away from the housing.

4. The calibration system as recited in claim 1, further comprising:
   a position measurement circuit in communication with the processor and adapted to detect the current position of the marker.

5. The calibration system as recited in claim 1, further comprising:
   a memory unit in communication with the processor and adapted for storage of the current position of the marker.

6. The calibration system as recited in claim 1, further comprising:
   a base coupled to the energy source and having an attachment mechanism adapted to attach the base to the housing.

7. An apparatus for calibrating an output signal of a linear position detector, comprising:
   a base;
   an attachment mechanism provided on the base and configured to engage a housing of a linear position detector to attach the base adjacent the exterior of a housing of a linear position detector; and
   an energy source connected to the base, and selectively movable from a home position to a selection position, wherein, in the selection position, the source is adapted to provide energy detectable by a sensor within a housing of a linear position detector to cause a reference position of a movable marker to be determined.

8. The apparatus as recited in claim 7, further comprising:
   a push button connected to the energy source and mounted to the base to move the energy source from the home position to the selection position.

9. The apparatus as recited in claim 8, further comprising:
   a biasing mechanism in contact with the push button and adapted to bias the button toward the home position.

10. The apparatus as recited in claim 7, wherein the attachment mechanism comprises a clip adapted to be adjusted from a first position to a second position.

11. The apparatus as recited in claim 7, further comprising:
    a second energy source connected to the base, and selectively movable from a home position to a selection position, wherein each of the energy sources are connected to a push button, each push button having a biasing mechanism.

12. A method for calibrating an output signal of a linear position detector having a housing and a movable marker, the method comprising:
    selectively providing energy from a location exterior of the housing;
    sensing the presence of the energy from within the housing; and
    upon sensing the energy, determining a reference point corresponding to the current position of the movable marker when the energy is sensed.

13. The method as recited in claim 12, wherein the step of providing energy comprises:
    moving a magnet toward the housing.

14. The method as recited in claim 13, wherein the step of sensing the presence of the energy comprises:
    providing a predetermined output signal when the magnet is within a predetermined proximity of the housing.

15. The method as recited in claim 12, wherein the step of determining a reference point comprises:
    detecting the current position of the movable marker; and
    saving the current position of the movable marker.

16. The method as recited in claim 12, further comprising:
    detecting a subsequent position of the movable marker;
    determining a scaled output signal based upon the subsequent position and the reference point;
    converting the scaled output signal to an analog signal; and
    providing the analog signal as an output.

17. A calibration system for a linear displacement detector having a movable marker, the system comprising:
    a housing;
    an activator located exterior to the housing and adapted to selectively apply an energy signal from an energy source through the housing; and
    a processor located within the housing and arranged in communication with a sensor, wherein the processor is adapted to determine a reference point based upon the current position of the marker when the sensor receives the energy signal within the housing.

18. The calibration system as recited in claim 17, further comprising:
- a position measurement circuit connected to the processor and adapted to detect the current position of the marker.

19. The calibration system as recited in claim 17, wherein the housing includes an inlet, and wherein the sensor is positioned adjacent the inlet and within the housing.

20. The calibration system as recited in claim 17, further comprising a base coupled to the activator, the base having an attachment mechanism adapted to engage an interface on the housing.

21. The calibration system as recited in claim 17, wherein the energy source comprises a magnet and the energy signal comprises a magnetic field.

22. The calibration system as recited in claim 17, wherein the housing is effectively sealed relative to ambient atmosphere.

23. The calibration system as recited in claim 17, wherein the energy signal comprises an electrical energy signal.

* * * * *